United States Patent Office 3,111,420
Patented Nov. 19, 1963

3,111,420
STAIN RESISTANT AMINOPLAST RESINS
Hermann V. Boenig, Akron, and Norman Walker, Parma, Ohio, assignors to Brookpark, Inc., Cleveland, Ohio, a corporation of Ohio
No Drawing. Filed July 12, 1960, Ser. No. 42,208
12 Claims. (Cl. 117—72)

This invention relates to the strain-proofing of aminoplast resin products.

Aminoplast resins find their way into many commercial products in which resistance to abuse is a major requirement. One of the important outlets for these resins is in tableware, wherein widespread use is made of the melamine-formaldehyde resins. Another important outlet is in the wear surfaces of laminates such as counter tops, table tops, trays and the like, wherein both melamine-formaldehyde and urea-formaldehyde resins are widely employed. These same resins and others of related nature are used in furniture, containers, protective jackets, closures, cabinet hardware, buttons, switch gear and in many other fields. In all of these areas, the aminoplast resins are favored over numerous other synthetic resins because of their excellent durability, resistance to ageing, heat resistance, moisture resistance, impact resistance and other desirable properties.

However, the aminoplast resins as a class are open to the criticism that they tend to accept and retain many ordinary household stains, particularly stains having their origins in foodstuffs such as coffee, tea, grape juice, orange juice, tomato juice, ketchup, and the like. While such stains usually appear and develop gradually, their presence tends to impair the continued value of the product in which the aminoplast resin is employed, particularly cups, saucers, plates, bowls and other dinnerware items. At the present time, practically all of the plastic dinnerware on the domestic market is made of melamine-formaldehyde resin. In common with other aminoplast resins, it is characterized by a tendency to develop stains with use over a prolonged period of time.

In the past, efforts have been made to improve on this state of affairs by modifying the composition of the aminoplast resin itself. Thus in the case of the melamine-formaldehyde resins attempts have been made to improve stain resistance by co-polymerizing the melamine with benzoguanamine. This procedure is the subject of Swiss Patent 308,280 granted September 16, 1955, to Ciba & Co. In the main, efforts along these lines have served only to delay the time required for the deep staining of melamine-formaldehyde tableware.

Another approach to the problem has revolved around the direct application of stain-resistance coating materials to the exposed surface of aminoplast resin products. Efforts along this line have failed largely because of what appears to be inherent incompatibility between the commonly used aminoplast resins and the more desirable coating materials. In some cases, initial adhesion has been obtained, only to be followed by delamination by the action of repeated dishwashing operations. To date, all such attempts at the direct application of stain-resistant coating materials to aminoplast resin products have been without success.

The present invention has to do with an improvement on this procedure involving the use of an intermediate layer of adhesive between the aminoplast resin and the coating material. In general, the adhesives found most useful for the purpose have been the so-called epoxy resins, either epoxy resins derived in typical fashion from bisphenol A and epichlorhydrin or modified epoxy resins characterized by the presence of carboxylic acid groups, sulphonic acid groups, other sulphur-containing groups, hydrogen-containing groups, etc. Using thin films of such adhesives on the exposed surface or surfaces of aminoplast resin products, it has been found feasible and practicable to bond stain-resistant coating materials to aminoplast resin products of a variety of different types.

As coating materials, the invention contemplates the use of synthetic resins of kinds that compare favorably with the aminoplast resin product itself as regards such properties as durability, resistance to ageing, heat resistance, moisture resistance, impact resistance and surface gloss. In addition to having these attributes, the coating material should be one that is compatible with the adhesive, although it is not necessary that it be compatible in the sense of having a similar chemical composition. Among the synthetic resins that have been successfully employed as coating materials are both thermoplastic and thermosetting resins. Particularly satisfactory for the purposes of the invention are the polycarbonate resins, the polyacrylate resins, the saturated and unsaturated polyester resins, and a number of others, as will appear below.

Thus it may be said to be an object of the invention to provide aminoplast resin products which, by virtue of the fact that they are clad with stain-resistant coating materials, have greatly enhanced value for the more important uses for which the aminoplast resins as a class are commonly employed. Although such uses include the now routine use of the aminoplast resins in furniture, housings, containers, closures, protective jackets, cabinet hardware, buttons, switch gear and miscellaneous products, a patricular object of the invention is to improve the stain-resistance of aminoplast resin dinnerware, trays, counters, table tops, etc., all of which are repeatedly exposed to staining in every day use. Other objects, advantages and features of the invention will be apparent from the description which follows, as well as from the various examples.

I. THE AMINOPLAST RESINS GENERALLY

In the plastics industry, the ordinary commercial aminoplast used for molding, although already thermoset, is a partial reaction product in the sense that heating to moderate temperatures will advance the degree of cross-linking, thereby giving rise to the final polycondensation product. As employed in conventional molding procedures, the aminoplast may be in finely divided solid form on or in the form of a liquid, in the latter case a solution, suspension or other dispersion in water or some other suitable liquid vehicle. In addition to the amine and aldehyde, the components entering into the manufacture of the ordinary commercial aminoplast products include mold lubricants, colorants, fillers and reinforcing materials and, if one is used, also the liquid vehicle. In the paragraphs that follow, the more important of these components will be considered separately.

A. *Amines*

Among the amines that may be utilized in making commercial aminoplasts for molding purposes are urea, thiourea, melamine, dicyandiamine, ethylene diamine, diphenylamine, aniline, methyl and ethyl aniline, toluidine or the like. Substituted compounds such as substituted triazines and substituted ureas; e.g., ethyl urea, can be used in place of the unsubstituted compounds. It is well within the skill of those versed in the plastics arts to use one or more of these or similar amines in making aminoplasts for commercial use. The mol ratios, amine to aldehyde, range from as little as 1:4 to as much as 1:1.5 in most commercial aminoplasts. These facts are well known and understood in the art.

B. *Aldehydes*

Although formaldehyde is very widely used, commonly in the form of formalin, it is possible to use other aldehydes such as acetaldehyde, propionic aldehyde, butyraldehyde, crotonaldehyde, furfural, acrolein, and the like. Partly because formaldehyde is relatively inexpensive, its use in making commercial aminoplasts is very general. However, those skilled in the plastics arts will understand that where formaldehyde is used, it is possible to substitute one or more of a variety of other aldehydes, including those already mentioned. In commercial aminoplasts, the aldehyde is used in excess with the mol ratio, aldehyde to amine, in the range between 4:1 to 1.5:1.

C. Colorants, Fillers and Reinforcements

Depending on the purpose for which a given commercial aminoplast is to be used, it may contain a colorant, filler or reinforcement and in many cases more than one such material. Colorants are used mainly where the product without the colorant would be colorless or light-colored; if used, they may take the form of organic or inorganic pigments, dyestuffs, etc. Fillers can vary widely, but in typical instances they consist of materials of vegetable origin such as alpha cellulose, wood flour, ground nut shells, etc. Asbestos floats, mica, diatomaceous earth and similar minerals are often used as fillers. As reinforcements, vegetable fibers, glass fibers, asbestos fibers and occasionally metal fibers are employed, either as such, in the form of rovings, or in the form of fabrics. The range of potentially useful materials in the category of colorants, fillers and reinforcements is very broad.

In a typical case, as where the product to be molded is to take the form of a cup, saucer, bowl or other dinnerware item, the aminoplast resin as introduced into the mold will comprise a commercial melamine-formaldehyde molding powder containing 35% of alpha cellulose as a filler; e.g., American Cyanamid Company's "Cymel 1077" or Allied Chemical Company's "Plaskon M-11113." If desired, an unfilled melamine-formaldehyde molding powder may be employed; e.g., American Cyanamid Company's "Cymel 405" or Allied Chemical Company's "Plaskon 11796." For many products, as, for example, for laminates, it is possible to use a filled or unfilled urea-formaldehyde molding powder; e.g., American Cyanamid Company's "Urac 125," which has an alpha cellulose content of 40%. In place of urea-formaldehyde resins, thiourea-formaldehyde resins may be used. In some instances, the aminoplast resin, whether of the melamine-formaldehyde type or of some other type, may be applied to a pre-existing product in the form of a dispersion in a liquid vehicle.

II. THE EPOXY RESINS AS ADHESIVES

An aminoplast resin product of one of the kinds described above may be coated with a solution, suspension or other dispersion of an epoxy resin adhesive: detailed information regarding resins, catalysts and liquid vehicles will be found in the paragraphs which follow.

The desired epoxy resin, together with a suitable catalyst, is applied while still incompletely cured to the aminoplast resin product by a spraying, brushing or dipping step, after which the liquid layer formed on the exposed surfaces of the product is either cured by baking for a few minutes at temperatures from 200 to 300° F. or allowed to dry at ordinary room temperatures. In the latter case, the time may vary from a few minutes to several hours. After baking or drying, a thin continuous film with a thickness of from 0.0005 inch or less to 0.002 inch or more should have been formed on the exposed surface or surfaces of the product to be coated.

In general, the epoxy resin adhesives found to be most effective for the purposes of the present invention are those made from bisphenol A and epichlorhydrin; for example, such epoxy resins as Minnesota Mining and Manufacturing Company's epoxy resin 1838. The reaction mechanism and chemistry are described in numerous patents and in the literature: see, for example, "Epoxy Resins, Their Applications and Technology," by H. Lee and K. Neville, published in 1957 by McGraw-Hill Publishing Co.; "Epoxy Resins," by I. Skeist, published in 1958 by Reinhold Publishing Company; and "Epoxyverbindungen und Epoxyharze," by A. M. Paguin, published in 1958 by Springer Verlag, Berlin, Germany. The latter in particular lists numerous patents (pages 589 to 600) and literature references (pages 613 to 616) dealing with the epoxy resin adhesives, their testing and use.

Apart from unmodified epoxy resins made from bisphenol A and epichlorhydrin, there are also available numerous modified epoxy resins of kinds known to the prior art, among them epoxy resins containing carboxylic or sulphonic acid groups, epoxy resins with nitrogen-containing groups, sulphur-containing epoxy compositions, epoxy resins containing groups that are capable of continuing polymerization, epoxy resin reaction products with silicones, epoxy resins combined with various additives, and combinations of epoxy compounds with polyesters, combinations of polyglycidyl ethers with phenol-formaldehyde precondensates, and reaction products of the latter with epichlorhydrin. Those found to give the best adhesion for the purposes of the present invention are the unmodified epoxy resins made by reacting bisphenol A and epichlorhydrin, sulphur-containing epoxy compositions, and epoxy resins containing carboxylic or sulphonic acid groups.

These and similar resinous compositions may be cured by several methods, as, for example, through their epoxy groups, through their hydroxyl groups, by means of cross-linking agents such as organic acids, acid anhydrides, primary and secondary amines, etc. The mechanisms are described in the previously mentioned literature. In general, the manner of applying these and similar curing agents may fairly be said to be well known and well understood by those skilled in the art.

Typical amines known to be effective in curing epoxy resins are diethylene triamine, diethylene amino propylamine, benzyl dimethyl amine, hexamethylene tetramine, triethylene tetramine, pyridine and N-(hydroxypropyl)-1,2-diaminopropane. Also available for the purpose are many commercial curing agents which may be described as of the amine type. Among the latter are the aliphatic polyamides, modified aromatic amines, aliphatic amine-glycidyl adducts, aliphatic amine-ethylene oxide adducts, aliphatic amine-cyanoethylation products, diethylamino propylamine, metaphenylene diamine, boron trifluoride amine complexes, and numerous compounds and complexes of diethyltriamine and triethylene tetramine.

III. COATING MATERIALS GENERALLY

Having in mind the desirable properties characterizing the aminoplast resins, it is evident that unless these properties are to be permitted to be sacrificed, the coating material to be applied to the surface of an aminoplast resin product must itself have excellent durability, resistance to ageing, heat resistance, moisture resistance, impact resistance, and a high surface gloss. Preferably, the coating material should be transparent and, where desired, susceptible of being colored in the process of manufacture by the addition of dyestuffs or pigments. For the particular purposes of the invention, a further requirement is that the coating material will not be easily stained by coffee, tea, fruit juices, ketchup, ink, lipstick and the like. Those coating materials that have been found to be most useful for the purposes of the present invention will be described below.

IV. COATING MATERIALS BASED ON POLYCARBONATE RESINS

Outstanding among the coating materials that have proved to be of value for the purposes of the invention are those based on the polycarbonate resins. In the form in which these resins are supplied by the manufacturers, they are largely or entirely polymerized but not cross-linked to any great extent. In general, they are made from bisphenol A and either diphenyl carbonate or phosgene. In either case, the product can be described as a linear aromatic polyester of carbonic acid. Such products are supplied by the Mobay Products Company under the trademark "Merlon" and by the General Electric Company under the trademark "Lexan." In connection with the latter, see the article "Lexan Polycarbonate Resin" in the April 1958 number of Modern Plastics Magazine.

Polycarbonate resins generally are partially soluble in aromatic hydrocarbons such as benzene, toluene, chlorobenzene and dioxane. They are easily soluble in chlorinated hydrocarbons such as methylene dichloride, ethylene dichloride and ethylene trichloride. In the practice of the invention, as will appear, a polycarbonate resin is dissolved in one of the chlorinated hydrocarbons and applied to the aminoplast resin product in solution form by a brushing, spraying or dipping step. In the meanwhile, the product should have been made ready by coating the exposed surface or surfaces with a thin layer of the adhesive that is to serve as the bonding agent.

After the polycarbonate resin has been applied to the aminoplast product to be stain-proofed, the coated product may be air-dried, oven-dried or both air-dried and oven-dried. If oven-drying is employed, it will not usually be necessary to heat the coated product for more than an hour at 200° F. If, on the other hand, the coated aminoplast product is to be air-dried, it will ordinarily be necessary to allow it to stand for a period of several hours at ordinary room temperatures. The film when dried should be of the order of .0005 to .003 inch in thickness.

V. ACRYLATE RESINS AS COATING MATERIALS

If desired, the aminoplast resin product may be coated in like fashion with polymethyl acrylate or polymethyl methacrylate, in either case in a solution in a chlorinated hydrocarbon such as methylene dichloride. Ordinarily, drying at a temperature of about 250° F. for a minimium of five minutes is sufficient to produce a hard, glossy, stain-free surface. Although other polymers and copolymers of esters of acrylic acid and methacrylic acid may be employed, it is preferred to use polymethyl methacrylate, largely because of the glass-like surface that results. Such surface is not readily impaired by weathering, by action of moisture, or extremes of atmospheric temperatures and is stain-proof in high degree. Preferred as sources of the acrylate resin are acrylic sirups such as Du Pont's "Lucite" acrylic sirup 203X or 204X.

VI. SATURATED POLYESTERS AS COATING MATERIALS

In lieu of the coating materials previously mentioned, it is equally feasible to use saturated polyesters. In general, the saturated polyesters are polymerized alkylene esters of terephthalic acid with or without modifiers such as copolymers. Examples of the latter are the corresponding esters of phthalic acid, isophthalic acid, 2,5-dimethyl terephthalic acid, hexahydro terephthalic acid and sundry others.

Representative compositions for making saturated polyester films are described in Whinfield et al. Patent 2,465,319, Swallow et al. Patent 2,497,376, and Billica Patent 2,647,885.

Preferred for the purposes of the invention are the polymers obtainable in known fashion by interacting ethylene glycol and terephthalic acid. Copolymers obtained by reacting ethylene glycol with mixtures of terephthalic and isophthalic acids are equally useful. Polymerization products of these kinds are available on the commercial market under the trademarks "Mylar" (E. I. du Pont de Nemours & Co.) and "Videne" (the Goodyear Tire & Rubber Co.). Products of this nature are readily soluble in ethylene dichloride and similar solvents.

VII. UNSATURATED POLYESTERS AS COATING MATERIALS

In addition to the previously mentioned coating materials, it is also possible to use solutions of unsaturated polyesters; viz., polyesters characterized by ethylenic unsaturation in which the polymer constitutes a polycondensation product of a dicarboxylic acid and a dihydroxy alcohol. Constituents other than the dicarboxylic acid and the dihydroxy alcohol which enter into the manufacture of typical polyester products include the cross-linking monomer, the catalyst, and the promoter, if one is used. In the paragraphs which follow, the more important of these constituents will be separately considered.

A. *Dicarboxylic Acids*

At the present time there is a wide choice of dicarboxylic acids that may be used in the formulation of unsaturated polyesters. In commercial practice, those acids most commonly employed are maleic acid, usually in the form of the anhydride, fumaric acid, and itaconic acid. Phthalic acid, ordinarily in the form of the anhydride, is sometimes included. Other substances that may be included are adipic acid, azelaic acid, and sundry saturated acids of similar configuration. In general, however, the principal and sometimes the only acid constituent is one of the simpler unsaturated acids, such as the previously mentioned maleic, fumaric and itaconic acids. It is conventionally the source of the ethylenic unsaturation of the polyester. This is the point where a cross-linking monomer may be most easily connected to two adjacent polyester chains.

B. *Dihydric Alcohols*

The range of dihydric alcohols is more narrowly circumscribed. Typical of those commercially employed are ethylene glycol, 1,2-propylene glycol, 1,3-butylene glycol, 2,3-butylene glycol, and the corresponding diethylene and dipropylene glycols. In present commercial practice, the dihydroxy alcohol is seldom the source of the ethylenic unsaturation of the polyester for the reason that unsaturated dihydroxy alcohols are not readily available in commercial quantities. The manner in which the dihydroxy alcohol reacts with the dicarboxylic acid to form the polyester is described in the techical literature.

C. *Cross-Linking Monomers*

It is commonplace to include a compatible cross-linking monomer that is itself characterized by ethylenic unsaturation. Preferably it is one which is capable of serving as a liquid vehicle for the polyester. Styrene is frequently used for this purpose, often alone but sometimes along with other monomers characterized by the presence of the vinyl radical. Typical examples are vinyl acetate, vinyl toulene, methyl methacrylate, ethyl methacrylate and others of like nature. Also used in this way are certain allyl esters such as diallyl phthalate, diallyl succinate and diallyl oxalate. Cyclopentadiene is sometimes used for the same purpose.

D. *Catalysts*

It is established practice to use as a catalyst an organic peroxide or hydroperoxide. The commonly used catalysts are benzoyl peroxide, lauryl peroxide, methyl ethyl ketone peroxide, and tertiary butyl perbenzoate. A negative catalyst or inhibitor is often included to lengthen the pot life of the mixture: hydroquinone and tertiary butyl hydroquinone are examples. Cobalt naphthenate is used sometimes as a promoter.

In commercial form, the polyester is often, but not always, supplied as a dispersion in the cross-linking monomer, particularly if the latter takes the form of a liquid at atmospheric temperatures and pressures. Usually the cross-linking monomer is present in an amount equal to about 10 to 40% of the total weight of the resinous components and the catalyst conventionally added to the polyester amounts to about 1% to 3% of the total weight of such components, ordinarily about 1 to 1.5%. In practice, it is feasible to use commercial unsaturated polyesters containing 30% styrene and 10% methyl methacrylate (Rohm & Haas Co.'s P-444). Another conventional unsaturated polyester contains 20% styrene and 20% methyl methacrylate (Interchemical Corp.'s 1026–2). Commercial polyesters of these and similar types may readily be dissolved in such solvents as ethylene dichloride, methylene dichloride, ethylene trichloride, etc., and, when so dissolved in concentrations between about 3 and 5%, may advantageously be used as coating materials for the purposes of the invention.

VIII. EXAMPLES

The examples which follow are representative of various ways of practicing the invention.

Example A

A methylene dichloride solution containing 1% by weight of an unmodified epoxy resin (Minn. Mining & Mfg. Co.'s epoxy resin 1838) and 1% by weight of diethylene triamine was sprayed on the inner surface of a white cup molded from melamine-formaldehyde molding powder containing 35% of alpha cellulose (American Cyanamid Co.'s "Cymel 1077"). The cup was then baked for 20 minutes in an oven heated to 250° F. The thickness of the resulting film was 0.001 inch. After cooling, the cup was sprayed with a methylene dichloride solution containing 3% by weight of a typical polycarbonate resin (General Electric Company's "Lexan") and allowed to dry at ordinary room temperatures. The thickness of the resulting film was .002 inch. After 20 staining cycles (described below), the coated surface of the cup was still white. The non-coated outer part of the cup was dark brown.

Example B

An ethylene dichloride solution was prepared containing 3% by weight of the same epoxy resin and 3% by weight of diethylene triamine as a catalyst. A cup was made from an unfilled melamine-formaldehyde molding powder (Allied Chemical Company's "Plaskon 11796") and was dipped in this solution in such a way as to immerse only half of the cup. The cup was removed after one second, left in the air for 10 seconds, baked for 5 minutes in an oven at 300° F., and allowed to cool. The thickness of the epoxy resin film was .001 inch. Then the treated half of the cup was immersed in an ethylene dichloride solution containing 5% of a saturated polyester (the Goodyear Tire & Rubber Co.'s "Videne A"), after which the cup was dried for 5 minutes at 300° F. The thickness of the polyester resin film was .0025 inch. It was then subjected to 20 staining cycles. The untreated half of the cup was dark brown, while the treated half was essentially unchanged in color.

Example C

A cup prepared from a representative filled urea-formaldehyde molding powder (American Cyanamid Company's "Beetle Molding Compound") was coated with a methylene dichloride solution containing 5 parts by weight of B. F. Goodrich Chemical Company's epoxy resin A 855–B and 5 parts by weight of the same company's polyamine catalyst A 854–B. Air drying produced a film measuring 0.001 inch in thickness. The treated half of the cup then was dipped in a methylene dichloride solution containing 7% polymethyl methacrylate (Du Pont's "Lucite" acrylic sirup 204X), after which it was baked for 5 minutes at 250° F. The results of 20 staining cycles were comparable to those of Examples A and B.

Example D

A commercial melamine-formaldehyde laminate (Formica Company's "Formica") of standard grade and satin finish was painted with the Minnesota Mining and Manufacturing Company's epoxy resin 1838 and baked for 40 minutes at 200° F. The thickness of the epoxy resin coating was about .001 inch. A 3% solution of polycarbonate resin ("Lexan") in methylene dichloride was applied by a hand roller. After air-drying, the laminate was coated again, air-dried for 5 minutes, and baked for 1 hour at 200° F. Thereafter both the coated laminate and a similar untreated laminate were subjected to 20 staining cycles. The treated laminate was found to be only slightly off-white, while the untreated laminate was dark brown in color.

ACCELERATED STAINING TEST

In each of the foregoing Examples A to D, the staining test involved boiling the test piece for one hour in coffee solution without permitting it to rest on the container bottom; removing the test piece; placing it in an automatic dish washer for the complete cycle of washing, rinsing and drying steps; and repeating the entire sequence of operations for a total of twenty times. Fresh coffee solution was used each time, the same being made by adding the following to one gallon of water: 6.4 ounces of coffee (percolator grind), 3.2 ounces of sugar, and 3.2 ounces of powdered cream, milk and lactose ("Pream"). Boiling water, to which the coffee was added, was permitted to act on the coffee for ten minutes in a percolator, after which the coffee grounds were removed. The sugar and dehydrated milk products were thereupon added to the solution, which was then used as above described for boiling the test pieces.

From the foregoing examples, it will be apparent that effective stain resistance was achieved in the case of each of the test samples notwithstanding the fact that they were subjected to far more drastic treatment in the effort to produce staining than would have been the case in actual use over a period of weeks or months. Having in mind the fact that in each case the test piece was boiled in coffee for an hour at a time for a total of 20 times, it is apparent that the coating material, even though present in the form of a very thin layer, successfully resisted temperatures at least as high as those likely to be encountered in use. Not only was there no delamination as a result of boiling, but subsequent exposure to the usual dishwashing cycle developed no tendency on the part of the coating layer to separate from the adhesive or on the part of the adhesive to separate from the aminoplast resin product.

Although in the case of each of foregoing Examples A, B and C the test piece took the form of a cup, there is no reason why some other item of tableware could not have been employed. If, for example, the test piece had taken the form of a saucer, ash tray, coaster, soup plate, dinner plate, sugar bowl, creamer, gravy boat or the like, similar results would have been expected. In Example D, the test piece took the form of a commercial laminate but might equally well have taken the form of a non-commercial product prepared especially for the purpose, as, for example, by laying down a film of an aminoplast resin on the surface of a panel of suitable type; e.g., metal, hard wood, heat-resistant glass, ceramic material, etc. In this example, the results obtained by the use of a commercial laminate may be taken as representative of what would be expected with any one of a variety of products consisting of a suitable base material with an aminoplast resin coating on its exposed surface or surfaces.

In the practice of the invention, other stain-resistant materials may be used than thoes suggested in the foregoing description. For example, for the purpose of the invention, allyl diglycol carbonate is an equivalent of the polycarbonate resin employed in Example A. With the further development of plastics technology, additional materials can be expected to become available. Other equivalents are very likely to be found and, if so, may be employed in the practice of the invention. This holds equally true as to equivalents of the epoxy resins used

What is claimed is:

1. A method of stain-proofing an aminoplast resin product that is susceptible to discoloration by ordinary household stains comprising the steps of applying an incompletely cured epoxy resin adhesive to the exposed surfaces of the product; curing the adhesive; applying to the coated surfaces of the product a liquid dispersion of a polymerization product selected from a group consisting of the organic polycarbonates, the polyacrylates and the saturated and unsaturated polyesters; and curing the polymerization product to form a hard, impervious film on said coated surfaces, in the meanwhile eliminating the dispersant.

2. A method according to claim 1 in which the aminoplast is a urea-formaldehyde condensation product.

3. A method according to claim 1 in which the aminoplast is a melamine-formaldehyde condensation product.

4. A method of stain-proofing an aminoplast resin product that is susceptible to discoloration by ordinary household stains comprising the steps of applying an incompletely cured epoxy resin adhesive to the exposed surfaces of the product; curing the adhesive; applying to the coated surfaces of the product an organic solvent solution of a polymerization product selected from a group consisting of the organic polycarbonates, the polyacrylates and the unsaturated polyesters; and curing the polymerization product to form a hard, impervious film on said coated surfaces, in the meanwhile eliminating the solvent.

5. A method of stain-proofing melamine-formaldehyde resin product that is susceptible to discoloration by ordinary household stains comprising the steps of applying an epoxy resin adhesive to the exposed surfaces of the product; applying to the coated surfaces of the product a dispersion of a polymerization product selected from a group consisting of the organic polycarbonates, the polyacrylates and the saturated and unsaturated polyesters; and curing the polymerization product to form a hard, impervious film on said coated surfaces, in the meanwhile eliminating the dispersant.

6. An article of manufacture comprising a synthetic resin product with an aminoplast surface that is susceptible to staining; a thin film of an epoxy resin adhesive on such surface; and, superimposed and cured in place on said expoxy resin adhesive, a thin, hard, impervious coat of a polymeric material selected from a group consisting of the organic polycarbonates, polyacrylates and saturated and unsaturated polyesters.

7. An article of manufacture according to claim 6 in which the product takes the form of a dinnerware item.

8. An article of manufacture according to claim 7 in which the product takes the form of a cup.

9. An article of manufacture according to claim 7 in which the product takes the form of a saucer.

10. An article of manufacture according to claim 6 in which the aminoplast is a urea-formaldehyde condensation product.

11. An article of manufacture according to claim 6 in which the aminoplast is a melamine-formaldehyde condensation product.

12. An article of manufacture comprising a tableware item with an aminoplast surface that is susceptible to staining; a thin film of an epoxy resin adhesive on such suprface; and, superimposed and cured in place on said epoxy resin adhesive, a thin, hard, impervious coat of a polymeric material selected from a group consisting of the organic polycarbonates, polyacrylates and saturated and unsaturated polyesters.

References Cited in the file of this patent

UNITED STATES PATENTS

| | | |
|---|---|---|
| 2,022,587 | Cunningham | Nov. 26, 1935 |
| 2,864,722 | Millar et al. | Dec. 16, 1958 |
| 2,880,116 | Alps et al. | Mar. 31, 1959 |